(12) United States Patent
Chou et al.

(10) Patent No.: US 9,903,359 B2
(45) Date of Patent: Feb. 27, 2018

(54) VALVE UNIT AND PERISTALTIC PUMP INCLUDING THE SAME

(71) Applicant: National Taiwan Ocean University, Keelung (TW)

(72) Inventors: Chau-Chang Chou, Taichung (TW); Te-Chun Wu, Taoyuan (TW); Wen-Jin Cherng, Keelung (TW)

(73) Assignee: National Taiwan Ocean University, Keelung (TW)

( * ) Notice: Subject to any disclaimer, the term of this patent is extended or adjusted under 35 U.S.C. 154(b) by 404 days.

(21) Appl. No.: 14/644,862

(22) Filed: Mar. 11, 2015

(65) Prior Publication Data

US 2016/0069461 A1 Mar. 10, 2016

(30) Foreign Application Priority Data

Sep. 10, 2014 (TW) .............................. 103131169 A

(51) Int. Cl.
| | |
|---|---|
| *F04B 43/12* | (2006.01) |
| *F04B 43/00* | (2006.01) |
| *F04B 53/10* | (2006.01) |
| *F16K 7/06* | (2006.01) |
| *F16K 15/03* | (2006.01) |

(52) U.S. Cl.
CPC .......... *F04B 43/0072* (2013.01); *F04B 43/12* (2013.01); *F04B 43/1223* (2013.01); *F04B 53/1052* (2013.01); *F16K 7/06* (2013.01); *F16K 15/038* (2013.01)

(58) Field of Classification Search
CPC ... F16K 7/02; F16K 7/04; F16K 7/045; F16K 7/06; F16K 15/038; F04B 43/12; F04B 43/1215; F04B 43/0018; F04B 53/1052; F04B 43/1223; F04B 43/0072
USPC ........................................... 417/476; 251/4, 9
See application file for complete search history.

(56) References Cited

U.S. PATENT DOCUMENTS

| | | | | |
|---|---|---|---|---|
| 5,579,959 A | * | 12/1996 | Bennett ................ | A47G 19/183 222/385 |
| 8,287,654 B2 | * | 10/2012 | Shaffer ................ | A61M 25/00 134/16 |
| 8,752,732 B2 | * | 6/2014 | Evans .................. | A47K 5/1215 222/1 |

* cited by examiner

*Primary Examiner* — Nathan Zollinger
(74) *Attorney, Agent, or Firm* — Brinks Gilson & Lione

(57) ABSTRACT

A vale unit includes a valve frame and two valve plates. The valve frame defines a valve opening. The valve plates are formed with protrusions. Each of the valve plates has a connecting end that is formed with a notch. The connecting ends are connected to each other. The protrusions protrude from peripheries of the notches. Each of the protrusions has a contact end. The contact ends cooperatively define a gap therebetween. The valve plates are co-rotatable about an axis between a closed position, in which the valve plates substantially close the valve opening, and an opening position, in which the valve plates open the valve opening. The gap has a width varying in response to co-rotation of the valve plates between the opening position and the closed position.

6 Claims, 6 Drawing Sheets

VALVE UNIT AND PERISTALTIC PUMP INCLUDING THE SAME

CROSS-REFERENCE TO RELATED APPLICATION

This application claims priority of Taiwanese Application No. 103131169, filed on Sep. 10, 2014.

FIELD

This disclosure relates to a valve unit and a peristaltic pump including the same, more particularly to a valve unit including at least two valve plates and at least two protrusions protruding from the valve plates for squeezing a flexible tubing extending therebetween.

BACKGROUND

U.S. Pat. No. 6,234,773 discloses a conventional linear peristaltic pump for pumping a fluid in a flexible tubing. The peristaltic pump includes a housing formed with a plurality of backing blocks which are aligned with one another along the length of the flexible tubing, a plurality of pumping plates disposed below and aligned with the backing blocks along a direction transverse to the length of the flexible tubing, a plurality of reshaping fingers operatively coupled to and alternately disposed with the pumping plates along the length of the flexible tubing, a drive shaft extending through the pumping plates, a plurality of cams connected to the drive shaft for driving the pumping plates to move up and down so as to compress the flexible tubing against the backing block and to release the flexible tubing from the compression. The reshaping fingers serve to reshape the compressed flexible tubing toward its original cross-sectional shape and an opened condition. As rotation of the drive shaft continues, the pumping plates are driven to move in a wave-like action, thereby pumping the fluid through the flexible tubing.

The structure of the conventional peristaltic pump is relatively complicate and bulky.

SUMMARY

Therefore, an object of the present disclosure is to provide a valve unit for driving a fluid in a flexible tubing that can overcome the aforesaid drawback associated with the prior art.

According to one aspect of this disclosure, there is provided a vale unit for driving a fluid in a flexible tubing. The valve unit comprises a valve frame and first and second valve plates. The valve frame defines a valve opening. The first and second valve plates are mounted movably on the valve frame, and are formed respectively with first and second protrusions. Each of the first and second valve plates has a connecting end that is formed with a notch. The connecting ends of the first and second valve plates are connected to each other. The first and second protrusions protrude respectively from peripheries of the notches in the connecting ends. Each of the first and second protrusions has a contact end. The contact ends of the first and second protrusions oppose each other, and cooperatively define a gap therebetween for extension of the flexible tubing therethrough. The first and second valve plates are co-rotatable relative to the valve frame in opposite rotational directions about a rotation axis transverse to the length of the flexible tubing between a closed position, in which the first and second valve plates substantially close the valve opening, and an opening position, in which the first and second valve plates open the valve opening. The gap has a width between the first and second contact ends that varies in response to co-rotation of the first and second valve plates between the opening position and the closed position, thereby permitting squeezing of the flexible tubing by the contact ends which move toward each other to narrow the width of the gap when the first and second valve plates co-rotate from the opening position to the closed position.

According to another aspect of this disclosure, there is provided a peristaltic pump that comprises a pump housing, a valve unit and a driving unit. The pump housing has an inner surface, and is adapted for extension of a flexible tubing therethrough. The valve unit is disposed in the pump housing, is movable relative to the pump housing along the length of the flexible tubing, and includes a valve frame and first and second valve plates. The first and second valve plates are formed respectively with first and second protrusions. Each of the first and second valve plates has a connecting end that is formed with a notch. The connecting ends of the first and second valve plates are connected to each other. The first and second protrusions protrude respectively from peripheries of the notches. Each of the first and second protrusions has a contact end. The contact ends of the first and second protrusions oppose each other, and cooperatively define a gap therebetween for extension of the flexible tubing therethrough. The valve frame is disposed adjacent to the inner surface, and defines a valve opening. The first and second valve plates are mounted movably on the valve frame. The driving unit is coupled to the valve frame so as to drive the valve unit to move relative to the pump housing along the length of the flexible tubing. The first and second valve plates are co-rotatable relative to the valve frame in opposite rotational directions about a rotation axis transverse to the length of the flexible tubing between a closed position, in which the first and second valve plates substantially close the valve opening, and an opening position, in which the first and second valve plates open the valve opening. The gap has a width between the first and second contact ends that varies in response to co-rotation of the first and second valve plates between the opening position and the closed position, thereby permitting squeezing of the flexible tubing by the contact ends which move toward each other to narrow the width of the gap when the first and second valve plates co-rotate from the opening position to the closed position.

BRIEF DESCRIPTION OF THE DRAWINGS

In drawings which illustrate embodiments of the disclosure.

DETAILED DESCRIPTION

Figure 1:
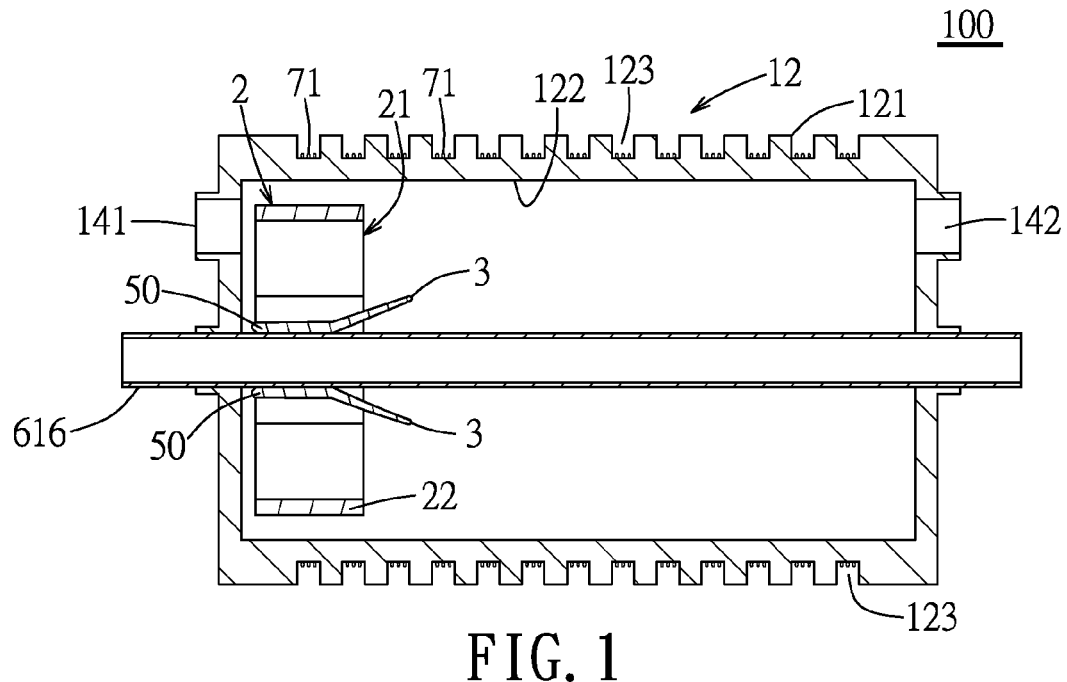
FIG. 1 is a schematic sectional view of the first embodiment of a peristaltic pump according to the present disclosure, illustrating a state where a valve unit of the first embodiment is disposed at an opening position and is disposed at one end of the peristaltic pump.

FIGS. 1 to 7 illustrate the first embodiment of a peristaltic pump 100 for driving a fluid (not shown) in a flexible tubing 616 according to the present disclosure. The peristaltic pump 100 includes a pump housing 12, a valve unit 2, and a driving unit including a plurality of conductive coils 71.

The pump housing 12 has an outer surface 121 and an inner surface 122, is adapted to be filled with a first liquid (not shown), is formed with a fluid inlet 141 and a fluid outlet 142, and is configured for extension of the flexible tubing 616 therethrough. The outer surface 121 is formed with a plurality of coil-retaining grooves 123 that are spaced apart from one another. The fluid inlet 141 is adapted to receive the first liquid into the pump housing 12. The fluid outlet 142 is adapted to drain the first liquid out of the pump housing 12. In one example, the first liquid may be a spent dialysate from a dialyzer (see FIG. 10). The flexible tubing 616 serves to receive a second liquid (not shown), such as the blood of a patient.

The valve unit 2 is disposed in the pump housing 12, is driven by the driving unit to move relative to the pump housing 12 along the length of the flexible tubing 616, and includes a valve frame 22 and first and second valve plates 3.

The first and second valve plates 3 are formed respectively with first and second protrusions 5. Each of the first and second valve plates 3 has a connecting end 31 that is formed with a notch 310. The connecting ends 31 of the first and second valve plates 3 are connected to each other, such that the first and second valve plates 3 cooperatively define a variable angle (α) therebetween. The first and second protrusions 5 protrude respectively from peripheries of the notches 310 in the connecting ends 310. Each of the first and second protrusions 5 has a contact end 50. The contact ends 50 of the first and second protrusions 5 oppose each other, and cooperatively define a gap 55 therebetween for extension of the flexible tubing 616 therethrough. The valve frame 22 is disposed adjacent to the inner surface 122 of the pump housing 12, and defines a valve opening 21. The first and second valve plates 3 are mounted movably on the valve frame 22. The variable angle (α) defined between the first and second valve plates 3 faces toward the valve opening 21.

The driving unit is electromagnetically coupled to the valve frame 22 so as to drive the valve unit 2 to move relative to the pump housing 12 along the length of the flexible tubing 616.

The first and second valve plates 3 are co-rotatable relative to the valve frame 22 in opposite rotational directions about a rotation axis (X) transverse to the length of the flexible tubing 616 between a closed position (see FIGS. 4 and 5), in which the variable angle (α) reaches a maximum value and the first and second valve plates 3 substantially close the valve opening 21, and an opening position (see FIGS. 6 and 7), in which the variable angle (α) reaches a minimum value and the first and second valve plates 3 open the valve opening 21. The gap 55 between the first and second contact ends 50 has a width (d) that varies in response to the co-rotation of the first and second valve plates 3 between the opening position and the closed position, thereby permitting squeezing of the flexible tubing 616 by the contact ends 50 which move toward each other to narrow the width of the gap 55 when the first and second valve plates 3 co-rotate from the opening position to the closed position. In one example, the minimum value of the variable angle (α) is about 20 degrees to 40 degrees, while the maximum value of the variable angle (α) is about 120 degrees to 140 degrees.

In this embodiment, the connecting ends 31 of the first and second valve plates 3 are pivoted to each other through a tongue-and-groove engaging manner. The first and second protrusions 5 are opposite to each other along a direction that is transverse to the rotation axis (X) and the length of the flexible tubing 616. Each of the first and second protrusions 5 is generally arc-shaped.

The valve frame 22 is formed with two T-shaped guiding slots 25 that are opposite to each other along a direction parallel to the rotation axis (X). Each of the T-shaped guiding slots 25 has a vertical section 251 and a horizontal section 252. Each of the first and second valve plates 3 is formed with a first guiding stud 33 and two second guiding studs 32. The first guiding studs 33 of the first and second valve plates 3 extend respectively into the vertical sections 251 of the T-shaped guiding slots 25. The second guiding studs 32 of each of the first and second valve plates 3 extend respectively into the horizontal sections 252 of the T-shaped guiding slots 25.

The valve frame 22 is magnetic. The conductive coils 71 are spaced apart from one another, and are mounted on and surround the pump housing 12. Each of the conductive coils 71 is electromagnetically coupled with the valve frame 22 so as to drive movement of the valve frame 22 along the length of the flexible tubing 616. In particular, each of the conductive coils 71 is operable to be powered with a polarity opposite to a polarity of the valve frame 22 so as to permit magnetic interaction between the valve frame 22 and the powered one(s) of the conductive coils 71. Alternatively, the valve frame 22 may be made from a non-magnetic material, and maybe provided with a magnet (not shown) thereon.

In this embodiment, the valve frame 22 is generally cylindrical in shape, and each of the first and second valve plates 3 is generally semi-circular in shape.

Figure 2:
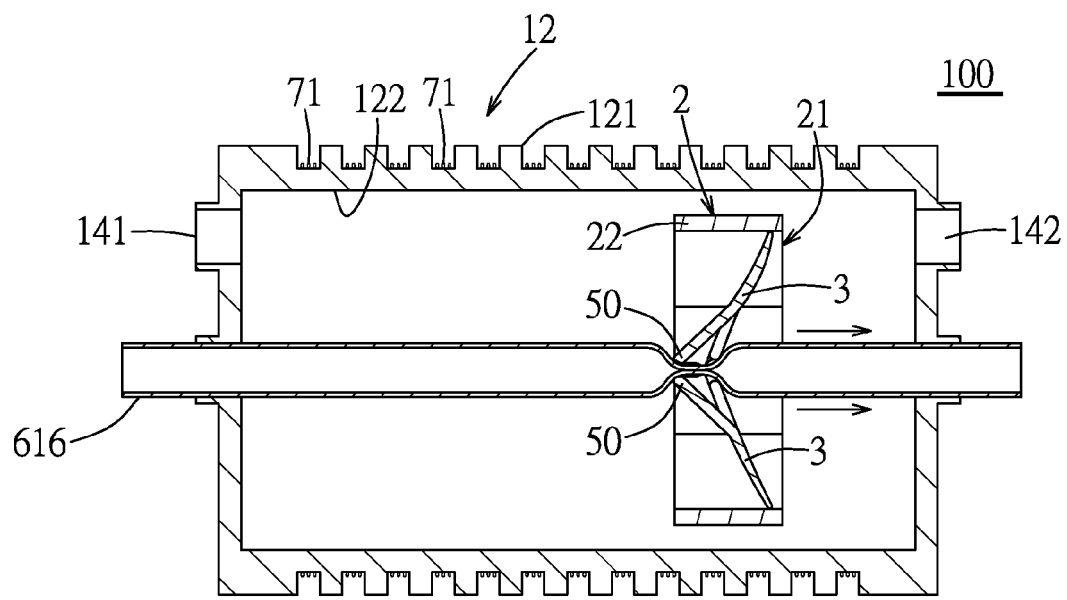
FIG. 2 is a schematic sectional view illustrating another state where the valve unit of the first embodiment is disposed at a closed position and is disposed at a position adjacent to an opposite end of the peristaltic pump.

To pump the second liquid through the flexible tubing 616, the conductive coils 71 are powered in succession so as to be successively and magnetically coupled with the valve frame 22 to drive movement of the vale unit 2 along the length of the flexible tubing 616 (see FIGS. 1 and 2). During the pumping action, the first and second valve plates 3 are moved against the first liquid filled in the pump housing 12, which creates a counter force that pushes the first and second valve plates 3 to co-rotate about the rotation axis (X) from the opening position to the closed position, thereby resulting in squeezing of the flexible tubing 616 by the contact ends 50 of the first and second protrusions 5.

Figure 8:
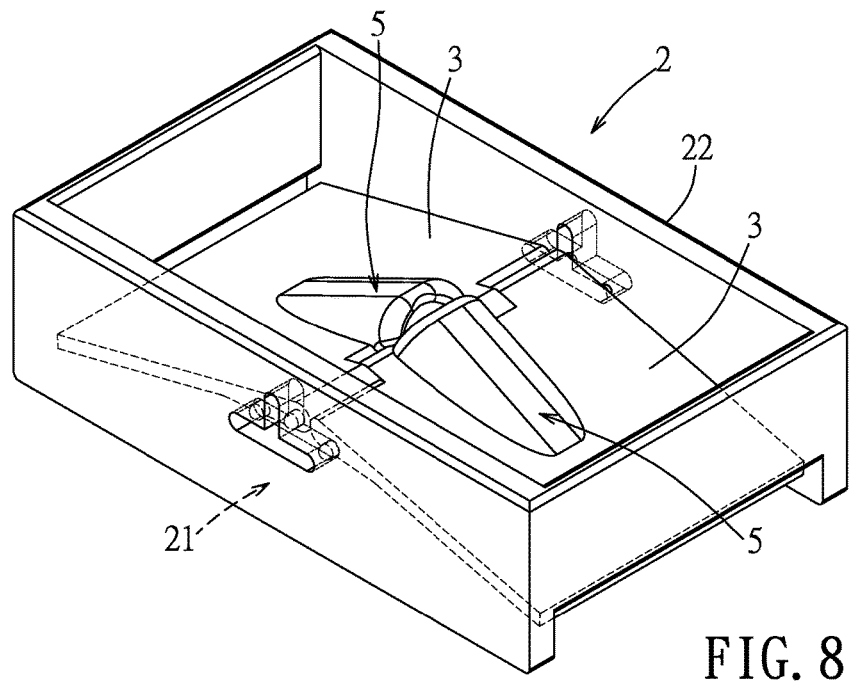
FIG. 8 is a perspective view of the valve unit of the second embodiment according to the present disclosure, illustrating a state where the valve unit is disposed at a closed position.
Figure 9:
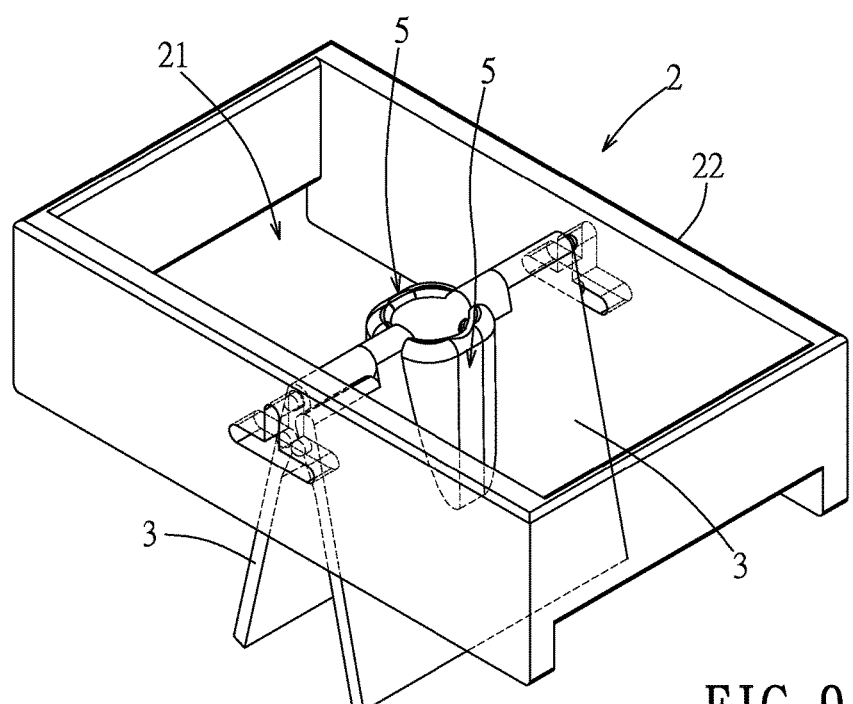
FIG. 9 is a perspective view of the valve unit of the second embodiment according to the present disclosure, illustrating another state where the valve unit is disposed at the opening position.

FIGS. 8 and 9 illustrate the second embodiment of the peristaltic pump according to the present disclosure.

The second embodiment differs from the previous embodiment in that the valve frame 22 of the second embodiment is rectangular in shape and each of the first and second valve plates 3 is rectangular in shape.

Figure 3:
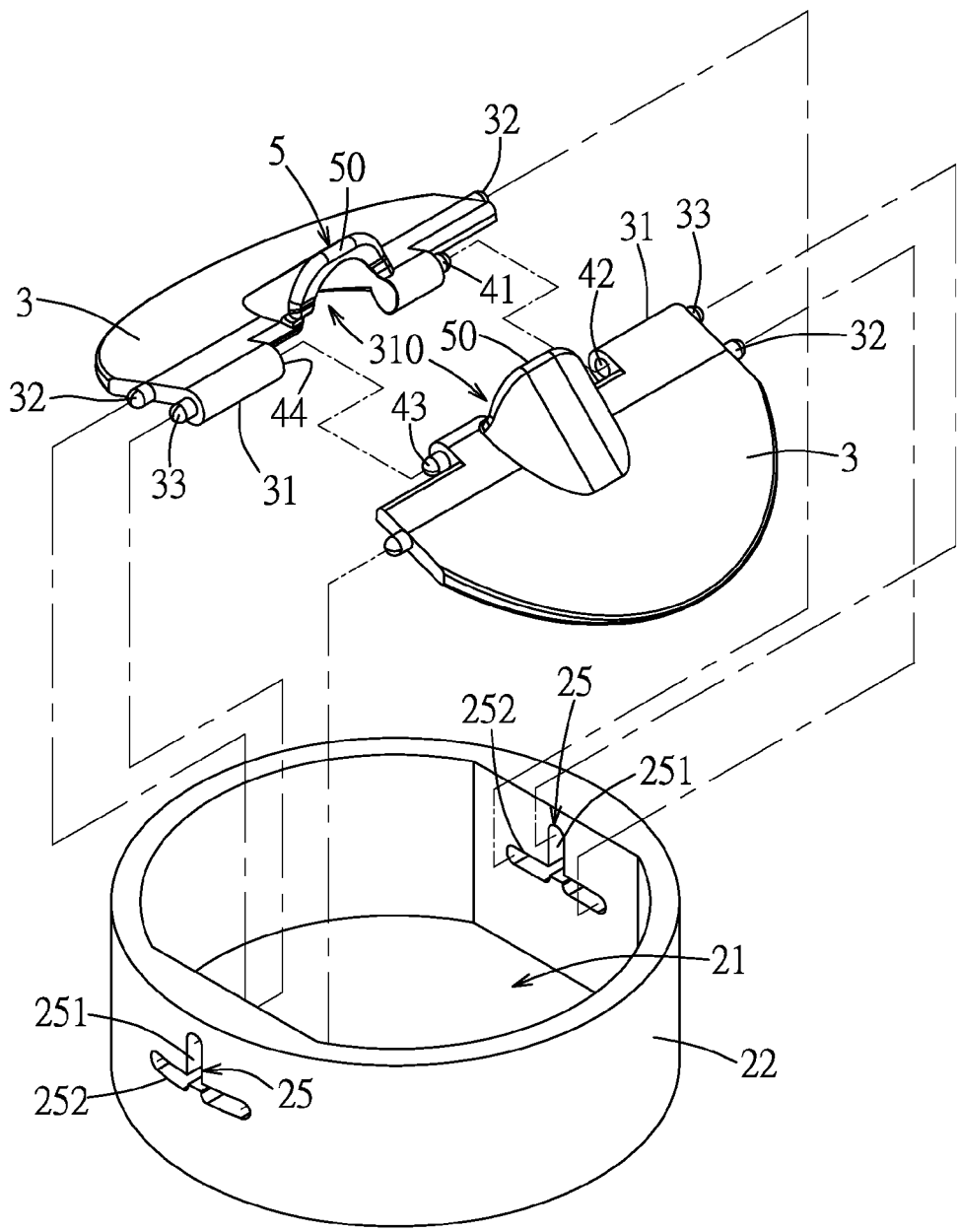
FIG. 3 is an exploded perspective view of the valve unit of the first embodiment.
Figure 4:
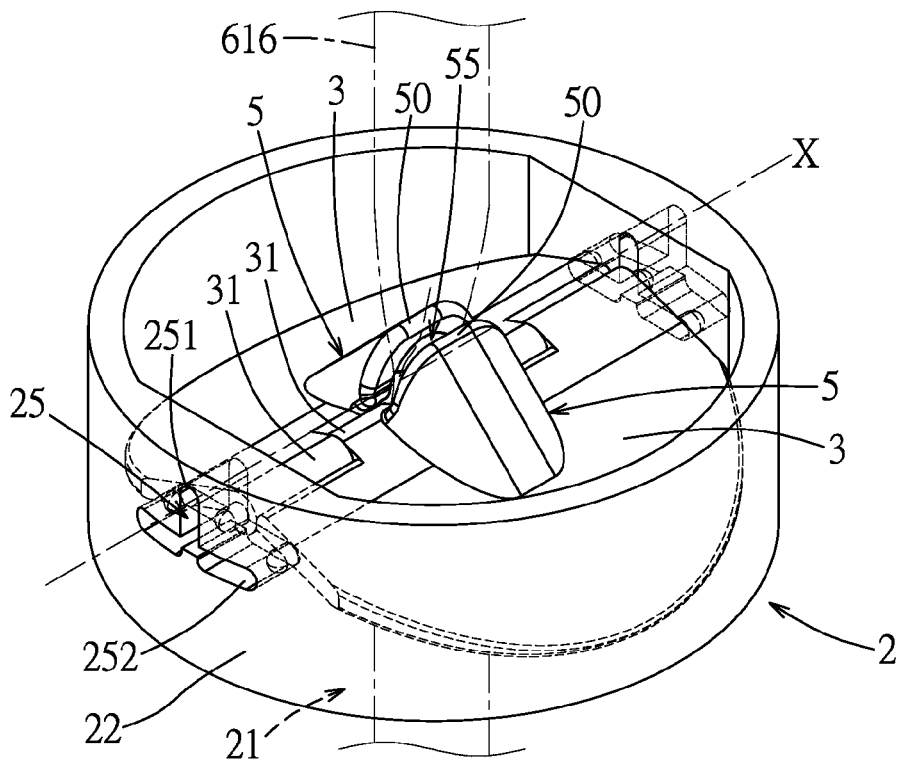
FIG. 4 is a perspective view of the valve unit of the first embodiment, illustrating a state where the valve unit is disposed at the closed position.
Figure 5:
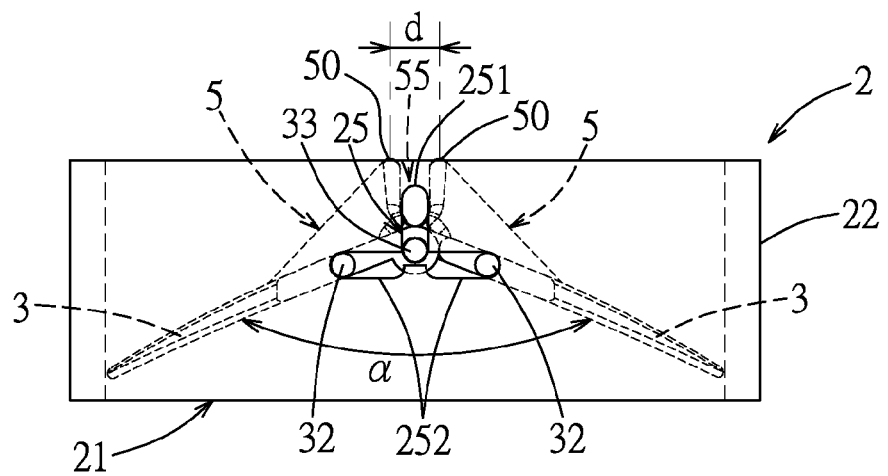
FIG. 5 is a side view of the valve unit of the first embodiment, illustrating the state where the valve unit is disposed at the closed position.
Figure 6:
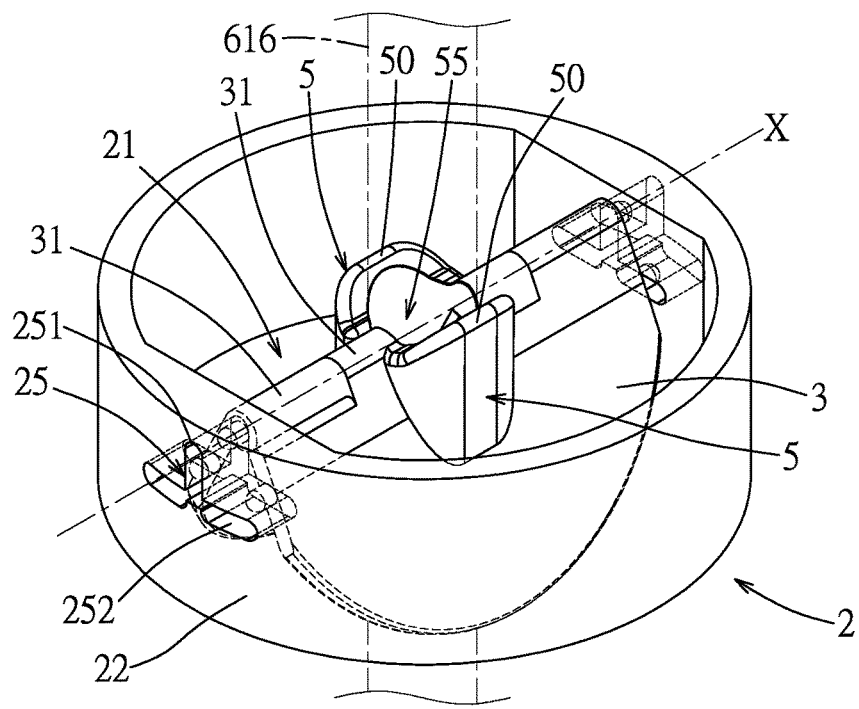
FIG. 6 is a perspective view of the valve unit of the first embodiment, illustrating another state where the valve unit is disposed at the opening position.
Figure 7:
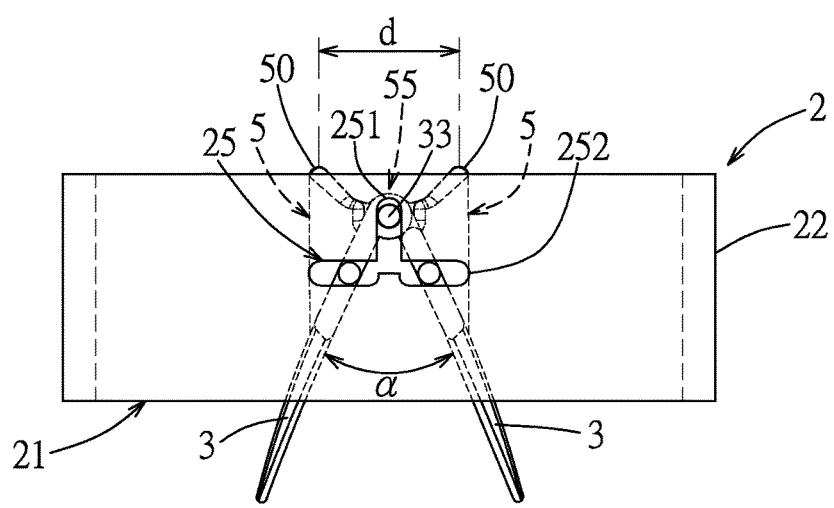
FIG. 7 is a side view of the valve unit of the first embodiment, illustrating the state where the valve unit is disposed at the opening position.
Figure 10:
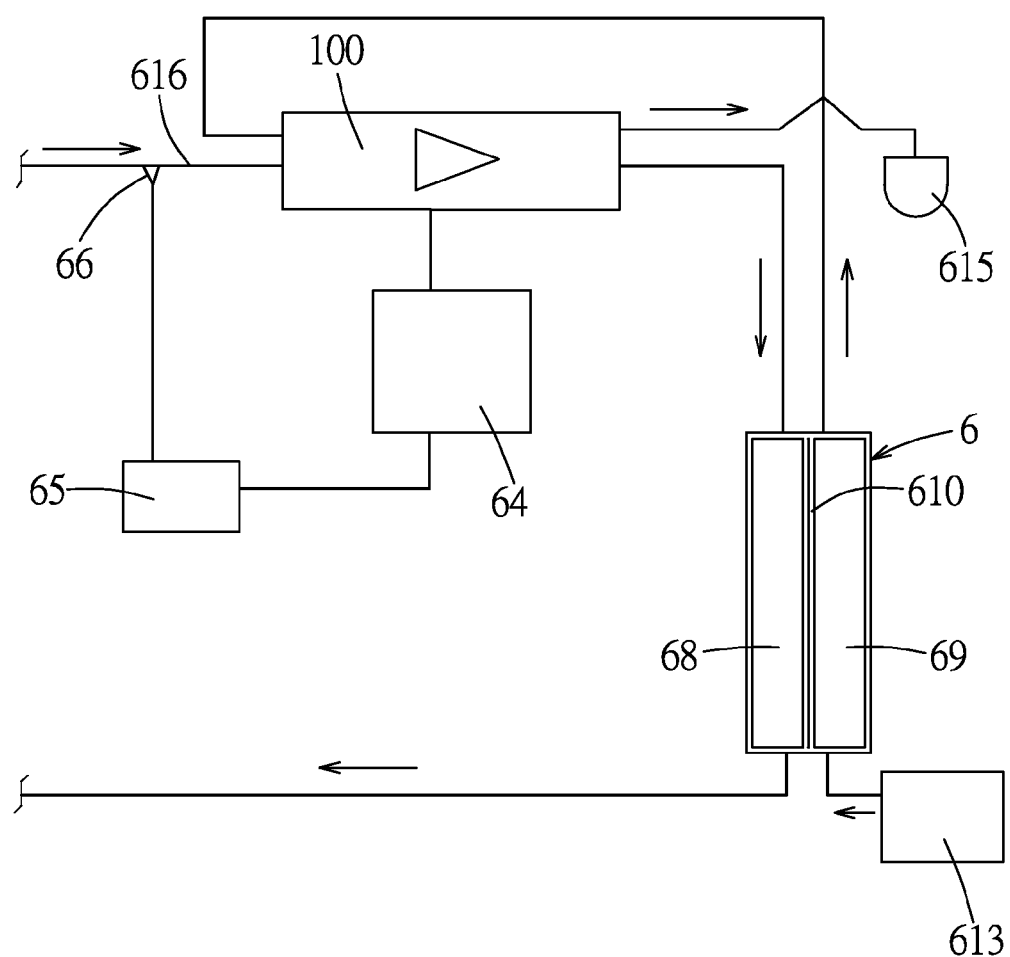
FIG. 10 is a schematic view illustrating a blood dialysis treatment system that includes the embodiment of the peristaltic pump of the present disclosure.

FIG. 10, together with FIGS. 1 to 3, illustrates a blood dialysis treatment system that includes a dialyzer 6, the embodiment of the peristaltic pump 100, a controller 65, a power source 64, a dialysate supplying source 613, a pressure sensor 66, and a dialysate collector 615. The dialyzer 6 includes a blood compartment 68, a dialysate compartment 69 and a semi-permeable membrane 610 disposed between the blood compartment 68 and the dialysate compartment 69. The peristaltic pump 100 is controlled by the controller 65 to pump blood to be treated from the body of a patient (not shown) through the blood compartment 68. The pressure sensor 66 detects the pressure of the blood in the flexible tubing 616, and generates a signal for the controller 65 to control the power to be supplied to the conductive coils 71. The moving speed of the valve unit 2 driven by the driving unit is controlled by the power supplied form the power source 64. The dialysate source 613 supplies a fresh dialysate fluid through the dialysate compartment 69 so as to carry out dialysis treatment of the blood to be treated through the semi-permeable membrane 610 in the dialyzer 6. The treated blood is returned from the dialyzer 6 to the body of the patient, while the spent dialysate fluid from the dialyzer 6 is first introduced into the pump housing 12 of the peristaltic pump 100 for operatively interacting with the first and second valve plates 3 for opening and closing the valve opening 21, and is then collected in the dialystae collector 615. Alternatively, the spent dialysate fluid may be directly introduced into the dialysate collector 615 and the pump housing 12 may be filled with another fluid (not shown) for interacting with the first and second valve plates 3.

With the inclusion of the first and second protrusions 5 formed respectively on the first and second valve plates 3 in the valve unit 2 of the peristaltic pump 100 of the present disclosure, the aforesaid drawback associated with the prior art can be alleviated.

While the disclosure has been described in connection with what is considered the exemplary embodiment, it is understood that this disclosure is not limited to the disclosed embodiment but is intended to cover various arrangements included within the spirit and scope of the broadest interpretation and equivalent arrangements.

What is claimed is:

1. A valve unit for driving a fluid in a flexible tubing, said valve unit comprising:
    a valve frame defining a valve opening; and
    first and second valve plates mounted movably on said valve frame and formed respectively with first and second protrusions, each of said first and second valve plates having a connecting end that is formed with a notch, said connecting ends of said first and second valve plates being connected to each other, said first and second protrusions protruding respectively from peripheries of said notches in said connecting ends, each of said first and second protrusions having a contact end, said contact ends of said first and second protrusions opposing each other and cooperatively defining a gap therebetween for extension of the flexible tubing therethrough;
    wherein said first and second valve plates are co-rotatable relative to said valve frame in opposite rotational directions about a rotation axis transverse to the length of the flexible tubing between a closed position, in which said first and second valve plates substantially close said valve opening, and an opening position, in which said first and second valve plates open said valve opening;
    wherein said gap has a width between said first and second contact ends that varies in response to co-rotation of said first and second valve plates between said opening position and said closed position, thereby permitting squeezing of the flexible tubing by said contact ends which move toward each other to narrow the width of said gap when said first and second valve plates co-rotate from said opening position to said closed position; and
    wherein said valve frame is formed with two T-shaped guiding slots that are opposite to each other along a direction parallel to said rotation axis, each of said T-shaped guiding slots having a vertical section and a horizontal section, each of said first and second valve plates being formed with a first guiding stud and two second guiding studs, said first guiding studs of said first and second valve plates extending respectively into said vertical sections of said T-shaped guiding slots, said second guiding studs of each of said first and second valve plates extending respectively into said horizontal sections of said T-shaped guiding slots.

2. The valve unit of claim 1, wherein said valve frame is magnetic.

3. The valve unit of claim 1, wherein said connecting ends of said first and second valve plates are pivoted to each other.

4. The valve unit of claim 1, wherein said contact ends of said first and second protrusions are opposite to each other along a direction that is transverse to said rotation axis and the length of the flexible tubing.

5. The valve unit of claim 1, wherein each of said first and second protrusions is generally arc-shaped.

6. The valve unit of claim 1, wherein said valve frame is generally cylindrical in shape and each of said first and second valve plates is generally semi-circular in shape.

* * * * *